United States Patent
Kitagawa (10) Patent No.: US 10,965,858 B2
(45) Date of Patent: Mar. 30, 2021

(54) IMAGE PROCESSING APPARATUS, CONTROL METHOD THEREOF, AND NON-TRANSITORY COMPUTER-READABLE STORAGE MEDIUM FOR DETECTING MOVING OBJECT IN CAPTURED IMAGE

(71) Applicant: CANON KABUSHIKI KAISHA, Tokyo (JP)

(72) Inventor: Eiichiro Kitagawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/202,569

(22) Filed: Nov. 28, 2018

(65) Prior Publication Data
US 2019/0166299 A1    May 30, 2019

(30) Foreign Application Priority Data
Nov. 30, 2017 (JP) .............................. JP2017-230869

(51) Int. Cl.
*H04N 5/232* (2006.01)
*H04N 7/18* (2006.01)
*H04N 5/14* (2006.01)

(52) U.S. Cl.
CPC ..... *H04N 5/23203* (2013.01); *H04N 5/23218* (2018.08); *H04N 5/23238* (2013.01); *H04N 7/18* (2013.01); *H04N 7/183* (2013.01); *H04N 5/144* (2013.01)

(58) Field of Classification Search
CPC ...... H04N 5/23203; H04N 7/183; H04N 7/18; H04N 5/23238; H04N 5/23218; H04N 5/144
See application file for complete search history.

(56) References Cited

U.S. PATENT DOCUMENTS

| | | | | |
|---|---|---|---|---|
| 9,417,689 | B1* | 8/2016 | Ramaswamy | G06F 3/01 |
| 9,418,278 | B2* | 8/2016 | Adachi | G06K 9/00771 |
| 9,953,225 | B2* | 4/2018 | Kawano | G06K 9/00771 |
| 2013/0278774 | A1* | 10/2013 | Fujimatsu | H04N 7/185 |
| | | | | 348/159 |
| 2018/0061161 | A1* | 3/2018 | Nagao | G06M 3/08 |

FOREIGN PATENT DOCUMENTS

| | | | |
|---|---|---|---|
| JP | 2012103752 A | 5/2012 | |
| JP | 2014204375 A | 10/2014 | |
| JP | 2016025516 A | 2/2016 | |
| JP | 2016039539 A | 3/2016 | |

* cited by examiner

*Primary Examiner* — Padma Haliyur
(74) *Attorney, Agent, or Firm* — Carter, DeLuca & Farrell LLP (57) ABSTRACT

Between first detection processing in which detection processing related to a moving object is executed without using a discrimination result indicating whether the moving object is a predetermined object and second detection processing in which the detection processing is executed by using the discrimination result, one of the first detection processing and the second detection processing which corresponds to setting related to installation of the image capturing device is executed.

7 Claims, 6 Drawing Sheets

IMAGE PROCESSING APPARATUS, CONTROL METHOD THEREOF, AND NON-TRANSITORY COMPUTER-READABLE STORAGE MEDIUM FOR DETECTING MOVING OBJECT IN CAPTURED IMAGE

BACKGROUND OF THE INVENTION

Field of the Invention

The present invention relates to an image processing apparatus, a control method thereof, and a non-transitory computer-readable storage medium, particularly to a technique for executing detection processing related to a moving object in a captured image.

Description of the Related Art

There is a technique of detecting and tracking an object or a human body in a video captured by a monitoring camera. In the video captured by a monitoring camera, it is difficult to continuously detect the face or the human body of an object because the features of the face or the human body may not always appear in a direction that is easy to detect. Hence, in order to perform tracking that is limited to a specific object such as a face or a human body, there is proposed a method of determining the passage of a moving object associated with a face or a human body.

In addition, a monitoring camera that uses a fish-eye lens can perform image capturing by using an angle of view which is much wider than a normal wide angle lens. However, since the shape of a video captured by the monitoring camera that uses a fish-eye lens is circular, the portion surrounding the video can be displayed wastefully as a black frame or a captured video that has been largely distorted by the distortion of the lens can be acquired depending on the angle of view used in video capturing.

Hence, an operation to create a rectangular-shaped video from a received captured video after correcting the distortion of the received captured video is performed in a viewer or an operation in which the monitoring camera transmits a distortion corrected video after performing image processing internally in the monitoring camera is performed.

Japanese Patent Laid-Open No. 2012-103752 discloses a method of associating the detection result of a moving object and the detection result of a human body and determining the passage of the moving object by tracing back to the past of the position information of the moving object associated with the human body. Also, Japanese Patent Laid-Open No. 2016-25516 discloses a method in which the installation direction of the camera is automatically estimated, and the distortion of the captured image is corrected by a method corresponding to the estimation result.

In the invention disclosed in Japanese Patent Laid-Open No. 2016-39539, a region where the human body detection processing is to be started in a video captured by a fish-eye lens is determined in accordance with the installation direction of the camera. Subsequently, after the execution of distortion correction processing that corresponds to the installation direction of the camera, human body detection processing is executed from a portion corresponding to the determined priority region.

Japanese Patent Laid-Open No. 2014-204375 discloses a method of detecting a specific object by using a plurality of cameras. The invention disclosed in Japanese Patent Laid-Open No. 2014-204375 estimates the direction of the movement of a person and the direction of a face by a camera which is installed on the ceiling, performs face detection processing for a camera that the front of the person has been estimated to be facing, and performs human body detection processing for a camera that the back of the person has been estimated to be facing.

However, since the invention disclosed in Japanese Patent Laid-Open No. 2012-103752 executes detection processing on accumulated locus data, many storage areas are required for recording loci. In addition, Japanese Patent Laid-Open No. 2012-103752 does not mention the difference in the appearance of the video depending on the installation direction of the camera, and does not consider the detection accuracy of a specific object when a fish-eye lens is used for video capturing in particular. Thus, there is a problem that the accuracy of passage determination will degrade depending on the detection position of the object and the installation direction of the camera in the case of a video captured by a fish-eye lens.

In the inventions disclosed in Japanese Patent Laid-Open Nos. 2016-25516 and 2016-39539, respectively, distortion correction processing by a double panorama method is performed in the camera when the camera is installed on the ceiling. The double panorama method is often used to correct the distortion of the fish-eye lens, but is problematic in that the area immediately below the camera is a blind spot where detection cannot be performed. The invention disclosed in Japanese Patent Laid-Open No. 2014-204375 requires two or more cameras to accurately detect a person, and cannot be supported by a single camera.

SUMMARY OF THE INVENTION

The present invention has been made in consideration of the above problems and provides a technique to more easily perform detection processing related to a moving object in a captured image.

According to the first aspect of the present invention, there is provided an image processing apparatus comprising: an execution unit configured to execute, between first detection processing in which detection processing related to a moving object in a captured image captured by an image capturing device is executed without using a discrimination result indicating whether the moving object is a predetermined object and second detection processing in which the detection processing is executed by using the discrimination result, one of the first detection processing and the second detection processing which corresponds to setting related to installation of the image capturing device; and an output unit configured to output an execution result of the execution unit.

According to the second aspect of the present invention, there is provided a method of controlling an image processing apparatus, the method comprising: executing, between first detection processing in which detection processing related to a moving object in a captured image captured by an image capturing device is executed without using a discrimination result indicating whether the moving object is a predetermined object and second detection processing in which the detection processing is executed by using the discrimination result, one of the first detection processing and the second detection processing which corresponds to setting related to installation of the image capturing device; and outputting a result of the execution.

According to the third aspect of the present invention, there is provided a non-transitory computer-readable storage medium storing a computer program for causing a computer to execute a method of controlling an image processing apparatus, the method comprising: executing, between first detection processing in which detection processing related to a moving object in a captured image captured by an image capturing device is executed without using a discrimination result indicating whether the moving object is a predetermined object and second detection processing in which the detection processing is executed by using the discrimination result, one of the first detection processing and the second detection processing which corresponds to setting related to installation of the image capturing device; and outputting a result of the execution.

Further features of the present invention will become apparent from the following description of exemplary embodiments (with reference to the attached drawings).

BRIEF DESCRIPTION OF THE DRAWINGS

FIGS. 4A and 4B are views for explaining the processes of steps S202 and S203, respectively;

DESCRIPTION OF THE EMBODIMENTS

The embodiments of the present invention will now be described with reference to the accompanying drawings. Note that the embodiments to be described below are examples of detailed implementation of the present invention or detailed examples of the arrangement described in the appended claims.

First Embodiment

Figure 1:
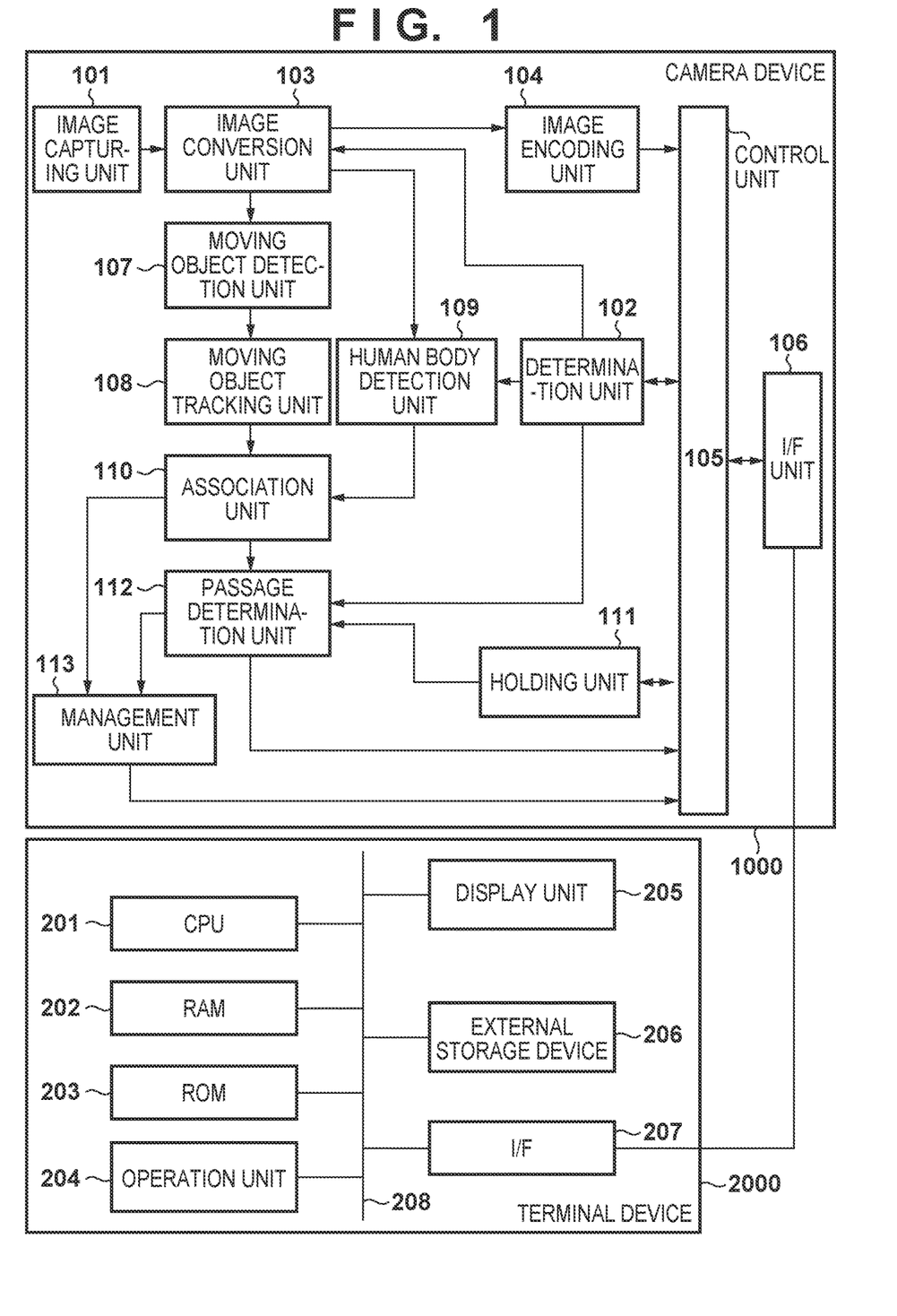
FIG. 1 is a block diagram showing an example of the arrangement of a system.

First, an example of the arrangement of a system according to the first embodiment will be described by using the block diagram of FIG. 1. As shown in FIG. 1, the system according to this embodiment includes a camera device 1000 such as a monitoring camera that is arranged in an actual space and a terminal device 2000 that is connected to the camera device 1000 via a wireless or wired network.

The terminal device 2000 will be described first. The terminal device 2000 is a computer device such as a smartphone, a tablet terminal device, a PC (personal computer), or the like, and makes settings on and controls the camera device 1000 as well as displays a video captured by the camera device 1000.

A CPU 201 executes various kinds of processing by using computer programs and data stored in a RAM 202 and a ROM 203. This allows the CPU 201 to control the operation of the overall terminal device 2000 as well as control or execute each processing operation which will be described later as a processing operation to be executed by the terminal device 2000.

The RAM 202 includes an area for storing computer programs and data loaded from the ROM 203 and an external storage device 206, a video received from the camera device 1000 via an I/F (interface) 207, and the like.

Furthermore, the RAM 202 includes a work area which is used by the CPU 201 to execute various kinds of processes. In this manner, the RAM 202 can appropriately provide various kinds of areas. The ROM 203 stores computer programs and data that need not be rewritten such as setting data and basic programs of the terminal device 2000.

An operation unit 204 is formed from a user interface such as a keyboard and a mouse, and a user can operate the operation unit to input various kinds of instructions to the CPU 201.

A display unit 205 is formed from a CRT, a liquid crystal screen, and the like, and can display the result of the processing by the CPU 201 by using images and characters. For example, the display unit 205 displays a video received from the camera device 1000 and a GUI (graphical user interface) for making various kinds of settings of the camera device 1000. Note that the operation unit 204 and the display unit 205 may integrally form a touch panel screen.

The external storage device 206 is a large-capacity information storage device which is represented by a hard disk drive device. An OS (operating system), computer programs and data to cause the CPU 201 to execute or control each processing operation to be described as that performed by the terminal device 2000, and the like are stored in the external storage device 206. The computer programs stored in the external storage device 206 include a computer program of the above-described GUI, a computer program of a viewer to display a video or the like received from the camera device 1000, and the like. The data stored in the external storage device 206 includes data which is to be handled by the terminal device 2000 as known information in the following explanation, data of the above-described GUI and viewer, and the like. Each of the computer programs and data stored in the external storage device 206 is appropriately loaded to the RAM 202 under the control of the RAM 202 and becomes a target of processing by the CPU 201.

The I/F 207 functions as a communication interface to execute data communication with the camera device 1000, and the terminal device 2000 exchanges data with the camera device 1000 via this I/F 207.

The CPU 201, the RAM 202, the ROM 203, the operation unit 204, the display unit 205, the external storage device 206, and the I/F 207 are all connected to a bus 208. Note that the arrangement of the terminal device 2000 shown in FIG. 1 is merely an example, and any kind of arrangement may be adopted as long as the processing operations to be described later as processing operations which will be performed by the terminal device 2000 can be executed.

The camera device 1000 will be described next. The camera device 1000 is an image capturing device that can be used as a monitoring camera which can be attached to a wall or a ceiling and can capture a video within an image capturing range. The camera device performs passage detection processing of detecting whether an object has passed in the image capturing range and transmits the result of the passage detection processing to the terminal device 2000. The camera device 1000 may be a single device or a device incorporated in a device such as a smartphone or a tablet terminal device.

An image capturing unit 101 captures a video of the external environment and outputs an image (captured image) of each frame of the image. A determination unit 102 determines the installation direction of the camera device 1000. An image conversion unit 103 outputs, in accordance with the installation direction of the camera device 1000 determined by the determination unit 102, one of a captured image from the image capturing unit 101 or a captured image acquired by performing distortion correction on the captured image.

An image encoding unit 104 encodes the captured image output from the image conversion unit 103. A control unit 105 includes one or more processors such as a CPU, an MPU, and the like and a memory that holds the computer programs and data to be executed by the processors. The control unit controls the operation of the overall camera device 1000 that includes the functional units of the camera device 1000 shown in FIG. 1 by causing the one or more processors to execute processing by using the computer programs and data stored in the memory. An I/F (interface) unit 106 functions as a communication interface for executing data communication with the terminal device 2000 via a network.

A moving object detection unit 107 detects a moving object from the captured image output from the image conversion unit 103. A moving object tracking unit 108 tracks the moving object by associating the same moving object between frames. A human body detection unit 109 detects a person (human body) from the captured image output from the image conversion unit 103.

An association unit 110 associates a moving object detected from the captured image and a human body detected from the captured image. A holding unit 111 holds parameters for detecting the passage of the moving object in the captured image output from the image conversion unit 103. A passage determination unit 112 performs, based on the parameters held in the holding unit 111, detection processing of the passage of the moving object in the captured image which is output from the image conversion unit 103. A management unit 113 manages each moving object that is not associated with a human body.

The moving object passage detection processing performed by the camera device 1000 will be described next in accordance with the flowchart of FIG. 2. Note that in the flowchart of FIG. 2, it is assumed that the image capturing unit 101 includes a fish-eye lens and outputs a fish-eye image as the captured image of each frame.

In step S201, the determination unit 102 determines the installation direction of the camera device 1000. Various kinds of arrangements can be considered for the arrangement for determining the installation direction of the camera device 1000, and any kind of arrangement may be adopted in this embodiment.

For example, in a case in which the camera device 1000 includes a direction sensor, the determination unit 102 determines the "current direction (camera direction) of the camera device 1000" measured by the direction as the installation direction of the camera device 1000.

The installation direction of the camera device 1000 may also be acquired from the terminal device 2000. For example, an operator can set the "installation direction of the camera device 1000" by operating the operation unit 204 of the terminal device 2000, and input a transmission instruction by operating the operation unit 204 after the installation direction has been set. Upon detecting the transmission instruction, the CPU 201 of the terminal device 2000 transmits, to the camera device 1000 via the I/F 207, the "installation direction of the camera device 1000" that has been set. This allows the determination unit 102 to acquire the "installation direction of the camera device 1000" from the terminal device 2000.

In addition, the operator may set the installation position of the camera device 1000 by operating the operation unit 204. In this case, the terminal device 2000 will transmit the installation position of the camera device 1000 to the camera device 1000.

For example, in a case in which the installation position of the camera device 1000 is the "wall surface", the determination unit 102 determines that a "horizontal direction" is the installation direction of the camera device 1000, and in a case in which the installation position is the "ceiling", the determination unit 102 determines that a "vertically downward direction" is the installation direction of the camera device 1000. In this case, a table showing the association between each installation position and each installation method needs to be pre-registered in the camera device 1000, and the determination unit 102 will acquire the installation direction corresponding to the installation position of the camera device 1000 by referring to this table. In a case in which the installation position of the camera device 1000 is the "wall surface" and the "horizontal direction" is determined to be the installation direction, the direction of the center of a region to be captured will be set to the horizontal direction. In a case in which the installation position of the camera device 1000 is the "ceiling" and the "vertically downward direction" is determined to be the installation direction of the camera device 1000, the direction of the center of the region to be captured will be set to the vertically downward direction.

Note that the "horizontal direction" is not intended to completely match a direction parallel to the floor surface (direction perpendicular to the wall surface), and a direction having an angle which falls within a predetermined angle range with respect to the direction parallel to the floor surface (direction perpendicular to the wall surface) is allowable. In the same manner, the "vertically downward direction" is not intended to completely match a (downward) direction perpendicular to the floor surface, and a direction having an angle which falls within a predetermined angle range with respect to the (downward) direction perpendicular to the floor surface is allowable.

Figure 2:
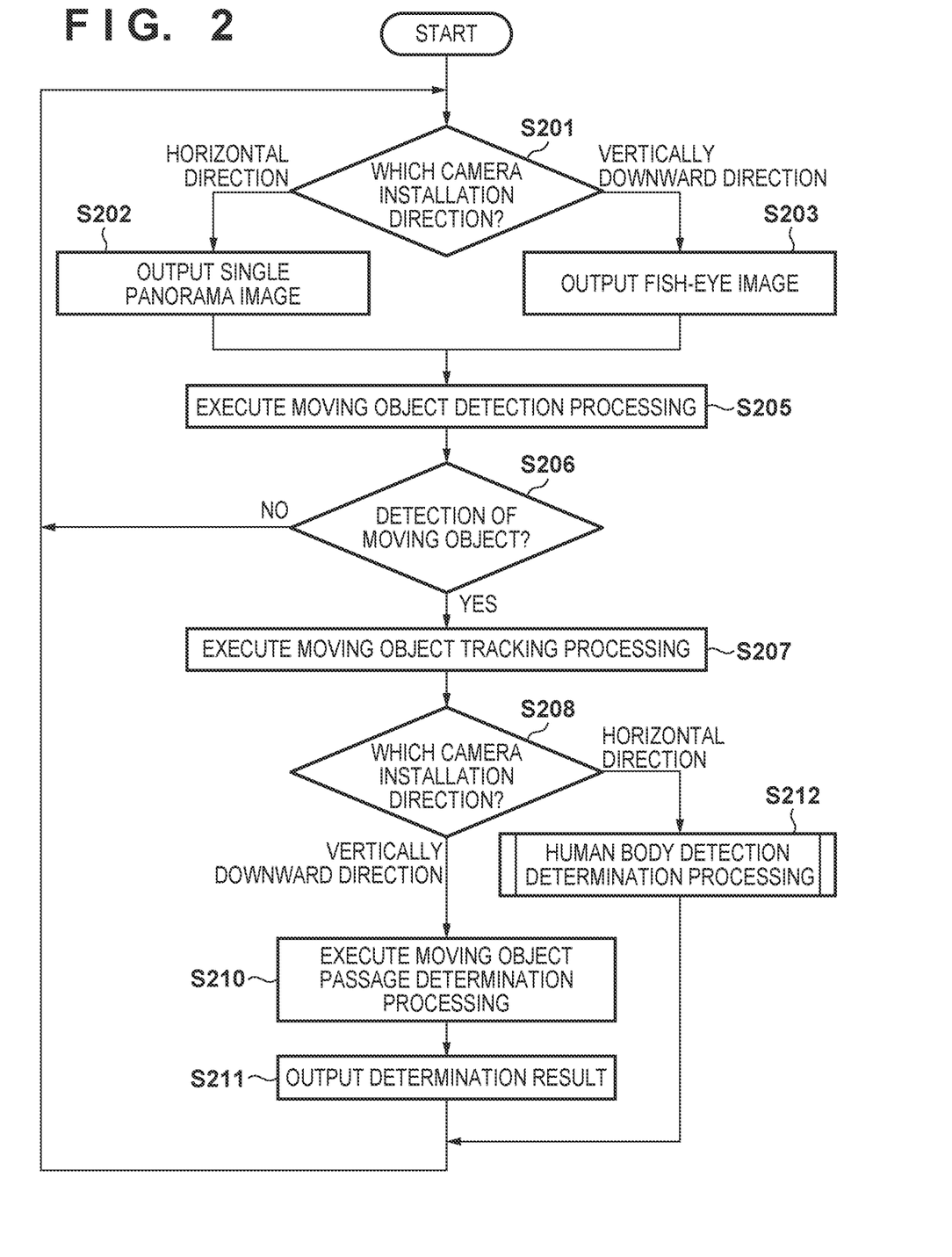
FIG. 2 is a flowchart of moving object passage detection processing.

The flowchart of FIG. 2 assumes, as an example, either the "horizontal direction" or the "vertically downward direction" as the installation direction of the camera device 1000. If the determination unit 102 determines that the installation direction of the camera device 1000 is the "horizontal direction", the process advances to step S202. If the determination unit 102 determines that the installation direction of the camera device 1000 is the "vertically downward direction", the process advances to step S203.

In step S202, the image conversion unit 103 generates a single panorama image from the fish-eye image output from the image capturing unit 101 and outputs the generated single panorama image as a processing target image. On the other hand, in step S203, the image conversion unit 103 outputs the fish-eye image output from the image capturing unit 101 as the processing target image.

Figure 4A:
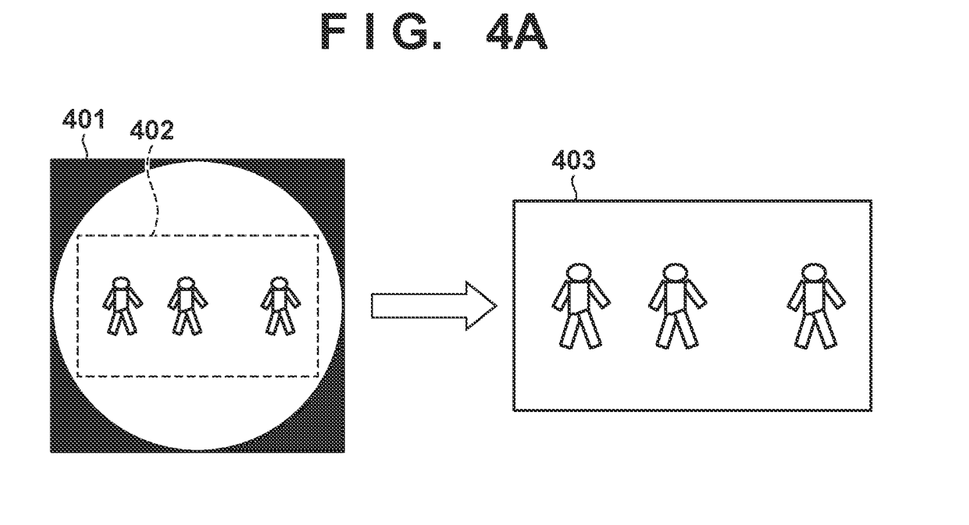

In step S202, for example, as shown in FIG. 4A, the image conversion unit 103 performs distortion correction on an image region 402 at the center of a fish-eye image 401, which has been output from the image capturing unit 101, and cuts out the corrected image region to generate a single panorama image 403. The image conversion unit 103 subsequently outputs the generated single panorama image 403 as the processing target image. Although the upper and lower portions of the fish-eye image 401 will be cut out in the generation of the single panorama image 403, neither of the portions is a region necessary for human body detection since the upper portion mostly captures the ceiling and the lower portion mostly captures the area immediately below the image capturing unit 101.

Figure 4B:
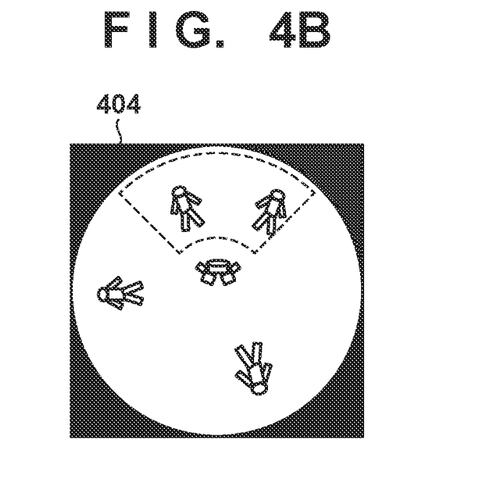

In step S203, as shown in FIG. 4B, the image conversion unit 103 outputs a fish-eye image 404, which has been output from the image capturing unit 101, as the processing target image without performing distortion correction on the fish-eye image 404. Although a person may appear sideways or upside down depending on his/her location in the fish-eye image 404, every angle of view is included in the image. An object far from the image capturing unit 101 appears closer to the periphery of the image, and an object near the image capturing unit 101 appears closer to the center of the image. Hence, depending on where the detection line is drawn, the center of the image can also become an important detection region.

Note that image processing such as color correction and the like may also be performed appropriately on the image in steps S202 and S203.

Referring back to FIG. 2, in the next step S205, the moving object detection unit 107 detects a moving object (moving object region) from the processing target image that has been output from the image conversion unit 103. Various kinds of methods can be adopted as the method for detecting a moving object in an image, and the detection method is not limited to a specific method. For example, a background image (a captured image which does not include a human body) that has been captured beforehand by the image capturing unit 101 can be held, and the moving object detection unit 107 can acquire a processing target image from the image conversion unit 103 and generate a difference image of the processing target image and the background image. The moving object detection unit 107 can subsequently detect, as a moving object region, a region formed by pixels that have, as respective pixel values, difference values equal to or more than a predetermined value in the difference image.

Next, in step S206, the control unit 105 determines whether the moving object detection unit 107 has detected one or more moving objects from the processing target image. As a result of this determination, if one or more moving objects have been detected from the processing target image, the process advances to step S207. Otherwise, the process returns to step S201.

In step S207, the moving object tracking unit 108 tracks each moving object between frames by associating the moving object detected in step S205 and the moving object detected from the processing target image of the immediately preceding frame with the same moving object. This tracking processing is a known technique, and a detailed description thereof will be omitted.

Next, in a case in which the determination unit 102 has determined that the installation direction of the camera device 1000 is the "horizontal direction" in the above described step S201, the process advances to step S212 via step S208. On the other hand, in a case in which the determination unit 102 has determined that the installation direction of the camera device 1000 is the "vertically downward direction" in the above described step S201, the process advances to step S210 via step S208.

In step S210, the passage determination unit 112 reads out the "parameter defining the detection line on the processing target image" which is held by the holding unit 111. The parameter held by the holding unit 111 is a parameter that indicates the image coordinate positions of the both ends of the detection line. Note that the holding unit 111 may also store a parameter that defines the detection region. In a case in which the detection region is rectangular, the parameter is a parameter indicating the image coordinate sets of the four corners of the rectangle (alternatively, for example, it may be a parameter indicating the image coordinate sets of the two opposing corners of the rectangle or may be a parameter indicating the image coordinate set of one corner and the vertical and horizontal sizes of the rectangle). In a case in which the detection region is circular, the parameter is a parameter indicating image coordinate position of the center of the circle and the radius. The parameters held by the holding unit 111 may also include a parameter defining the moving object that is be the passage detection target.

The operator may operate an operation unit (not shown) included in the camera device 1000 to set the parameters to be held in the holding unit 111 or the parameters may be transmitted to the camera device 1000 after the operator of the terminal device 2000 operates the operation unit 204 to set the parameters. In either setting method, the set parameters are acquired by the control unit 105, and the acquired parameters are stored in the holding unit 111. These parameters may be edited appropriately.

The passage determination unit 112 determines (passage detection processing) whether the movement locus of the moving object tracked by the moving object tracking unit 108 has passed the detection line (and/or the detection region) defined by the parameter held in the holding unit 111. Note that in a case in which the holding unit 111 includes a parameter defining the moving object that is to be the passage detection target, the passage determination unit 112 performs the passage detection processing on the moving object corresponding to this parameter, among the moving objects detected in the above-described step S205. For example, assume that the holding unit 111 stores a parameter indicating "H vertical pixels×W horizontal pixels" as the size of the moving object which is to be the passage detection processing target. At this time, the passage determination unit 112 executes, among the moving objects detected in the above-described step S205, the passage detection processing of each moving object of a size equal to or more than "H vertical pixels×W horizontal pixels". In a case in which the holding unit 111 stores a parameter defining the attribute (sex, the color of clothing, moving speed, or the like) of the moving object, the passage determination unit 112 performs passage detection processing on each moving object corresponding to the attribute among the moving objects detected in the above-described step S205.

In step S211, the control unit 105 transmits the result of the determination by the passage determination unit 112 to the terminal device 2000 via the I/F unit 106. For example, in a case in which the passage determination unit 112 has detected that one or more moving objects have passed the detection line and/or the detection region, the control unit 105 transmits the notification information to the terminal device 2000 to notify the operator of the terminal device 2000 about this passage. The notification information may be, for example, a message (this may be a text or an image) indicating that one or more moving objects have passed the detection line and/or the detection region, or may be information (frame information) of the frame surrounding the region of each moving object that has passed the detection line and/or the detection region. In addition, in case in which the operator of the terminal device 2000 is to be notified of the passage of the detection line and/or the detection region by the one or more moving objects by sound output, the notification information may be sound data corresponding to the notification contents.

The CPU 201 of the terminal device 2000 that has received such a piece of notification information performs information notification processing corresponding to the notification information. For example, in a case in which the notification information is the above-described message, the CPU 201 displays this message on the display unit 205. In a case in which the notification information is the frame information, the CPU 201 displays, on the display screen of the display unit 205, a frame image, which has been indicated by the frame information, in a position (position of the region of the moving object that passed the detection line and/or the detection region) which has been indicated by the frame information. In a case in which a sound output device such as a loudspeaker is connected to the terminal device 2000, the CPU 201 causes a sound based on the sound data included in the notification information to be output from the sound output device. Subsequently, the process returns to step S201.

Figure 3:
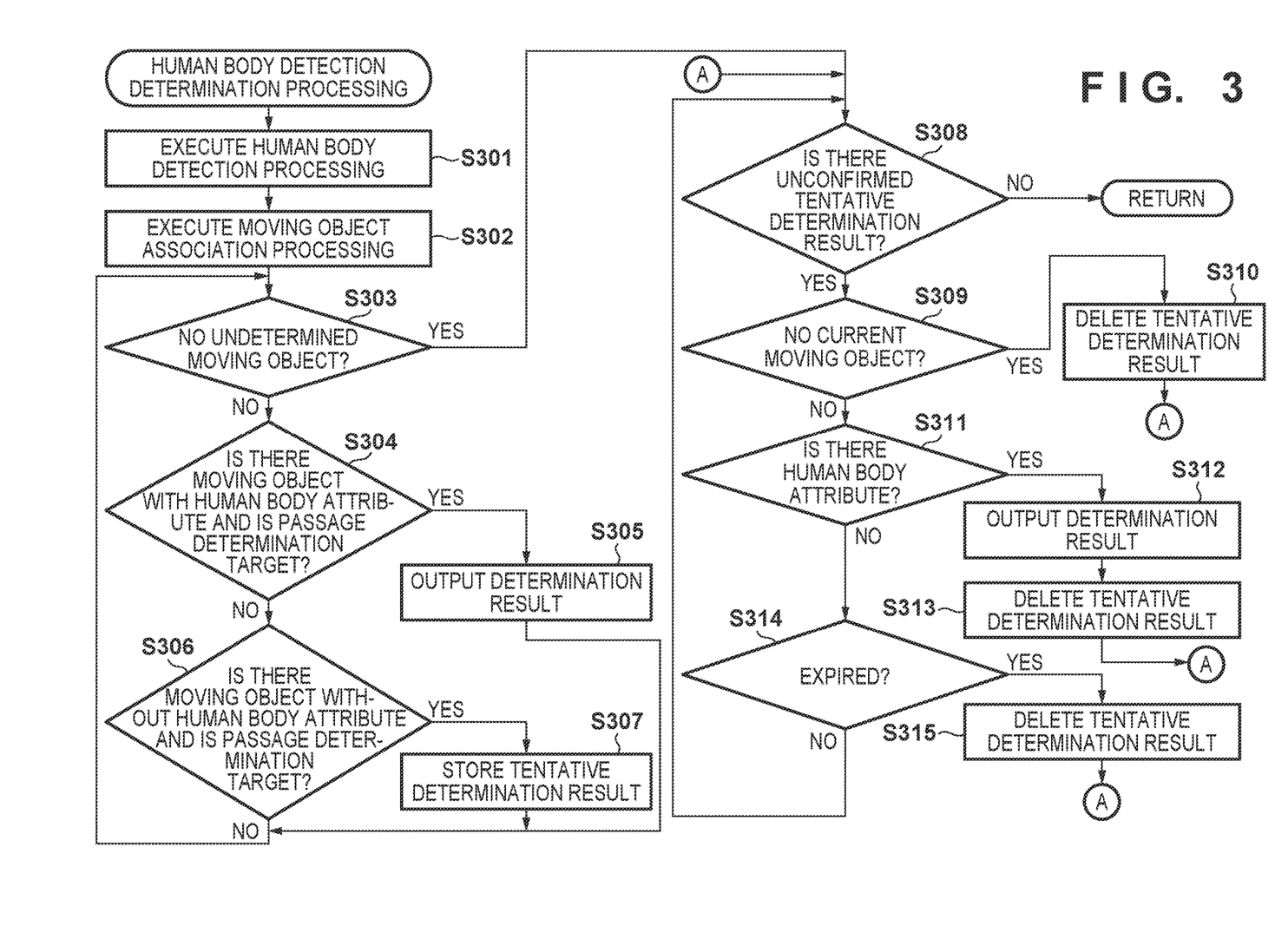
FIG. 3 is a flowchart illustrating the details of processing performed in step S212.

On the other hand, in step S212, passage detection processing is performed on the processing target image in accordance with the flowchart of FIG. 3. Details of the processing of step S212 will be described in accordance with the flowchart of FIG. 3.

In step S301, the human body detection unit 109 determines whether each moving object region (image region) in the processing target image is a human body region. Various kinds of processing can be adopted as the processing for determining whether each moving object region in the processing target image is a human body region, and the processing is not limited to specific processing.

For example, the human body detection unit 109 can determine that the moving object region is a human body region if the similarity between the image feature amount of the moving object region and the image feature amount of a pre-collected human body region is equal to or more than a threshold. If the similarity is less than the threshold, the human body detection unit determines that the moving object region is not a human body region.

Also, for example, the human body detection unit 109 may determine whether the moving object region is a human body region based on the output of a learning device acquired by inputting the image feature amount of the moving object region to the learning device that has learned the image feature amount of the pre-collected human body region.

In this manner, it is possible to specify whether each moving object region in the processing target image is a human body region by the process of step S301. Hence, in step S302, a moving object region, which has been determined to be a human body region among the moving object regions in the processing target image, is associated with "information that indicates a human body region" (human body attribute) by the association unit 110. Each moving object region that has not been associated with a human body attribute in the processing target image is associated with a non-human body attribute by the association unit 110. This association processing executed by the association unit 110 corresponds to the association processing of the moving object region and the human body region.

Note that it may be set so that the human body detection unit 109 will execute, in step S301, processing to detect the human body region on the entire processing target image, and the association unit 110 will associate, in step S302, the human body attribute with each moving object region whose distance to the human body region in the processing target image is less than a threshold. Also, it may be set so that the association unit 110 will associate a human body attribute to the moving object region if the ratio of the entire area of the moving object region with respect to an "area overlapping with the human body region" is equal to or more than a predetermined value.

Note that in a case in which the processing target image includes a plurality of human bodies that overlap each other, there is a possibility that the plurality of human bodies will be detected as one moving object region in the processing target image. In a case in which a plurality of human body regions may be included in one moving object region, the association unit 110 may divide the one moving object region in accordance with each human body region, and associate a human body attribute to each human body region. In this manner, the target of passage detection processing can be narrowed down to a human body in subsequent processes by associating a moving object region which seems like a human body region in the image with a human body attribute.

As long as a human body attribute is associated with a moving object region that seems like a human body region in the processing target image and a non-human body attribute is associated with a moving object region that does not seem like a human body region in the processing target image, the processes of steps S301 and S302 are not limited to specific processes.

In step S303, the passage determination unit 112 determines whether a moving object region that has not been selected yet as a passage detection target remains among the moving object regions in the processing target image. As a result of this determination, if there is a remaining moving object region which has not been selected yet, the process advances to step S304. Otherwise, the process advances to step S308.

In step S304, the passage determination unit 112 determines whether a moving object that has not been selected yet as the passage detection processing target remains among the moving object regions which have been associated with a human body attribute in the processing target image. As a result of this determination, if there is a remaining moving object region that has not been selected yet, the process advances to step S305. Otherwise, the process advances to step S306.

In step S305, the passage determination unit 112 selects, as a selected moving object region, the moving object region that has not been selected yet as the passage detection processing target among the moving object regions which have been associated with a human body attribute in the processing target image, and the passage detection processing is performed on the selected moving object region. Note that as described above, in a case in which the holding unit 111 holds a parameter defining the moving object which is to be a passage detection target, a moving object region which corresponds to the parameter is set as the selection target among the moving object regions associated with the human body attribute.

In the passage detection processing performed in step S305, since the passage detection processing will be performed on each moving object determined to be a human body, it is possible to perform processing in which the monitoring target limited to a human body, such as, for example, processing to count the number of human bodies that have passed the detection line and/or the detection region.

The result (determination result) of the passage detection processing by the passage determination unit 112 is transmitted to the terminal device 2000 by the control unit 105 via the I/F unit 106. The process subsequently returns to step S303.

On the other hand, in step S306, the passage determination unit 112 determines whether a moving object region that has not been selected yet as the passage detection processing target remains among the moving object regions which have been associated with a non-human body attribute in the processing target region. As a result of the determination, if there is a remaining moving object region that has not been selected yet, the process advances to step S307. Otherwise, the process returns to step S303.

In step S307, the passage determination unit 112 selects, as a selected moving object region, one moving object region that has not been selected yet as the passage detection processing target among the moving object regions which have been associated with the non-human body attribute in the processing target image, and the above-described passage detection processing is performed on the selected moving object region. Note that, as described above, in a case in which the holding unit 111 holds a parameter defining the moving object which is to be a passage detection target, a moving object region which corresponds to the parameter is set as the selection target among the moving object regions associated with the non-human body attribute. The management unit 113 holds each "moving object region associated with a non-human body attribute in the processing target image" and its corresponding "result (tentative determination result) of the passage detection processing on the moving object region" as a set. The process subsequently returns to step S303.

In step S308, the management unit 113 determines whether it is managing one or more sets. As a result of this determination, if the management unit 113 is managing one or more sets, the process advances to step S309. On the other hand, if the management unit 113 is not managing the above-described set, the process advances to step S201.

In step S309, the management unit 113 determines whether a set of a moving object region that has not been detected from the processing target image of the current frame is present among the sets managed by the management unit 113. As a result of this determination, if a set of a moving object region that has not been detected from the processing target image of the current frame is present among the sets managed by the management unit 113, the process advances to step S310. On the other hand, if a set of a moving object region that has not been detected from the processing target image of the current frame is not present among the sets managed by the management unit 113, the process advances to step S311.

In step S310, the management unit 113 deletes, among the sets it is managing, the set of a moving object region that has not been detected from the processing target image of the current frame. The process subsequently returns to step S308.

On the other hand, in step S311, the management unit 113 determines whether a set with the same moving object region as the moving object region (moving object region associated with a human body attribute) which has been detected from the processing target image of the current frame is present among the sets the management unit itself is managing. As a result of this determination, if the set is present, the process advances to step S312. Otherwise, the process advances to step S314.

In step S312, the control unit 105 transmits, to the terminal device 2000 via the I/F unit 106, the result of the passage detection processing included in the set with the same moving object region as the moving object region (moving object region associated with a human body attribute) which has been detected from the processing target image of the current frame, among the sets managed by the management unit 113. Note that in step S312, the control unit 105 and/or the passage determination unit 112 may transmit, to the terminal device 2000 via the I/F unit 106, a passage detection processing result corresponding to the set managed by the management unit 113 among the passage detection processing results of the moving object regions (moving object regions associated with a human body attribute) which has been detected from the processing target image of the current frame.

In step S313, the management unit 113 deletes, from the sets it is managing, the set with the same moving object region as the moving object region (moving object region associated with a human body attribute) which has been detected from the processing target image of the current frame.

In step S314, the control unit 105 determines whether there is an expired set among the sets managed by the management unit 113. For example, the control unit 105 determines that, among the sets managed by the management unit 113, a set in which a predetermined time or more has elapsed since the start of its management is an expired set. As a result of this determination, if there is an expired set among the sets managed by the management unit 113, the process advances to step S315, and if there is no expired set among the sets managed by the management unit 113, the process advances to step S308. In step S315, the management unit 113 deletes the expired set. The process subsequently returns to step S308.

In this manner, according to this embodiment, it is possible to perform, for the same determination parameter, passage determination processing suited to the installation direction of the camera, and accurate determination of human passage is possible while allowing settings to be made easily.

Second Embodiment

In the first embodiment, since human body region discrimination in an image was not performed when the installation direction of the camera device 1000 was the vertically downward direction, passage detection processing considering the human body region was not performed. In the second embodiment, in a case in which a dictionary for human body region discrimination has been registered in a camera device 1000, passage detection processing considering the human body region will be performed since the human body region in the image can be discriminated even if the installation direction of the camera device 1000 is the vertically downward direction. Only differences from the first embodiment will be described hereinafter, and arrangements which are the same as those of the first embodiment will be assumed unless particularly mentioned otherwise.

Figure 5:
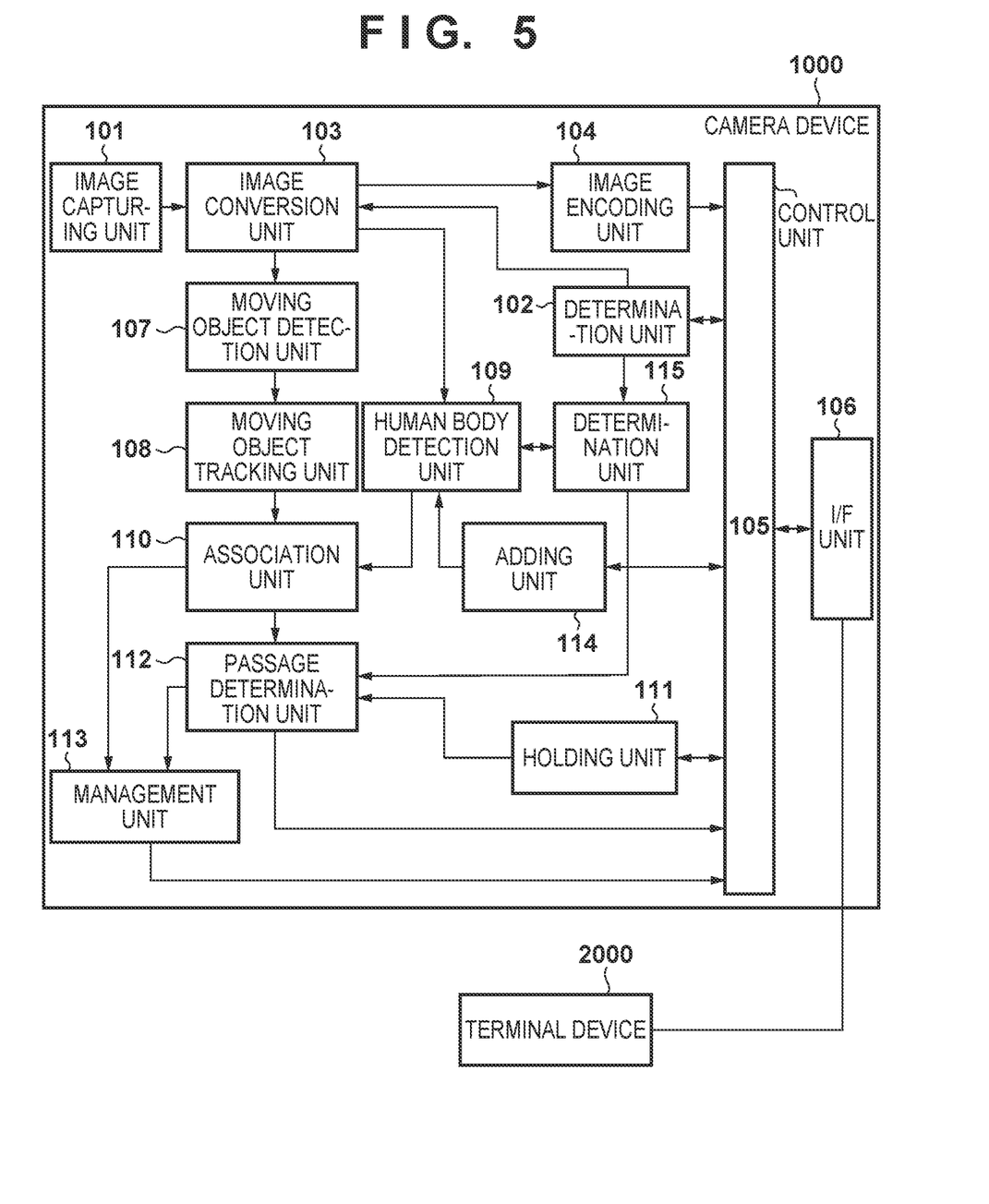
FIG. 5 is a block diagram showing an example of the arrangement of a system.

An example of the arrangement of a system according to this embodiment will be described hereinafter with reference to the block diagram of FIG. 5. As shown in FIG. 5, the arrangement shown in FIG. 5 is an arrangement formed by adding a determination unit 115 and an adding unit 114 to the camera device 1000 in the arrangement shown in FIG. 1.

In the first and second embodiments, a frontal direction dictionary which is a dictionary for discriminating an upright human body (a human body (to be referred to as an upright human body hereinafter) that has been captured head to toe from the upper portion to the lower portion of the image) in a processing target image has been pre-registered in the camera device 1000. Also, in the first embodiment as well as this embodiment, a human body detection unit 109 can use this frontal direction dictionary to discriminate an upright-human-body region from the processing target image.

In addition to this, this embodiment includes an arrangement for registering an additional dictionary to the camera device 1000 to allow discrimination of a human body region that has been rotated in an image. The adding unit 114 is a unit for adding and registering such an additional dictionary to the camera device 1000. Various kinds of methods can be considered for the registration method of the additional dictionary to the camera device 1000, and any method may be adopted in this embodiment. For example, in a case in which a memory device such as an SD card or a USB memory is attached to the camera device 1000, the adding unit 114 can read out the additional dictionary from the memory device and register the additional dictionary in the camera device 1000. In a case in which an additional dictionary has been transmitted from the terminal device 2000, the adding unit 114 receives this transmitted dictionary and registers the dictionary in the camera device 1000.

Figure 6:
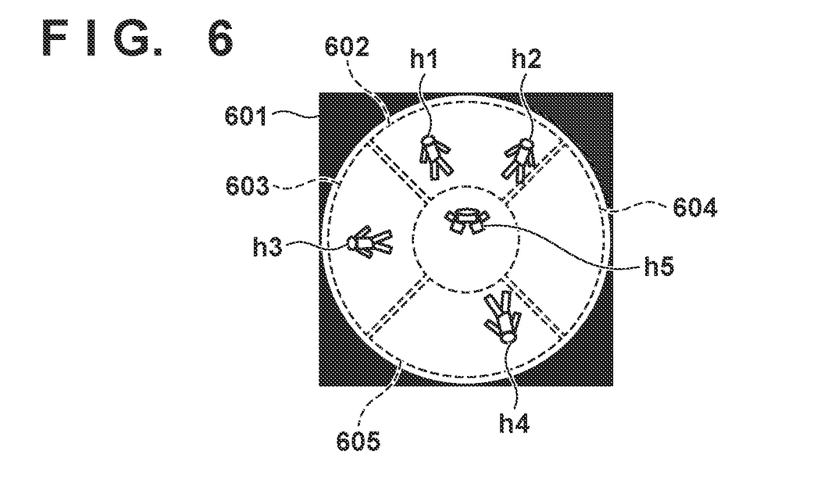
FIG. 6 is a view for explaining human body detection processing.

For example, human bodies h1 and h2 have been captured in a partial region 602, a human body h3 has been captured in a partial region 603, a human body h4 has been captured in a partial region 605, and no human body has been captured in a partial region 604 in a donut-shaped region in a fish-eye image 601 shown in FIG. 6. In addition, a human body h5 has been captured in a partial region at the center of the fish-eye image 601.

The human bodies h1 and h2, which are captured in the partial region 602, are both upright human bodies. Hence, the human body detection unit 109 can use the frontal direction dictionary to perform human body discrimination processing, and the human bodies h1 and h2 can be discriminated from the partial region 602 as a result.

The human body h3 that has been captured in the partial region 603 is a human body (to be referred to as a lateral human body hereinafter) that has been captured head to toe from the left end to the right end of the fish-eye image 601. Hence, the adding unit 114 can register a dictionary (lateral direction dictionary) for discriminating such a lateral human body as an additional dictionary to the camera device 1000 so that the human body detection unit 109 can use the lateral direction dictionary to perform human body discrimination processing and discriminate, as a result, the human body h3 from the partial region 603.

The human body h4 that has been captured in the partial region 605 is a human body (to be referred to as an upside-down human body hereinafter) that has been captured head to toe from the lower portion to the upper portion of the fish-eye image 601. Hence, the adding unit 114 can register a dictionary (upside-down direction dictionary) for discriminating such a lateral human body as an additional dictionary to the camera device 1000 so that the human body detection unit 109 can use the upside-down direction dictionary to perform human body discrimination processing and discriminate, as a result, the human body h4 from the partial region 605.

In this embodiment, assume that the adding unit 114 newly additionally registers, as additional dictionaries, the lateral direction dictionary and the upside-down direction dictionary to the camera device 1000 in which the frontal direction dictionary has been pre-registered. Therefore, processing to discriminate whether a moving object is a human body can be performed as long as the moving object is positioned in one of the partial regions 602, 603, 604, and 605.

Although the human body h5 has been captured in the central region of the fish-eye image 601 here as described above, it is not discriminated as a human body even if one of the frontal direction dictionary, the lateral direction dictionary, and the upside-down direction dictionary is used because this human body is not a frontal human body, a lateral human body, or an upside-down human body. However, since this human body h5 will be detected as a moving object, it will be associated with a non-human body attribute.

Figure 7:
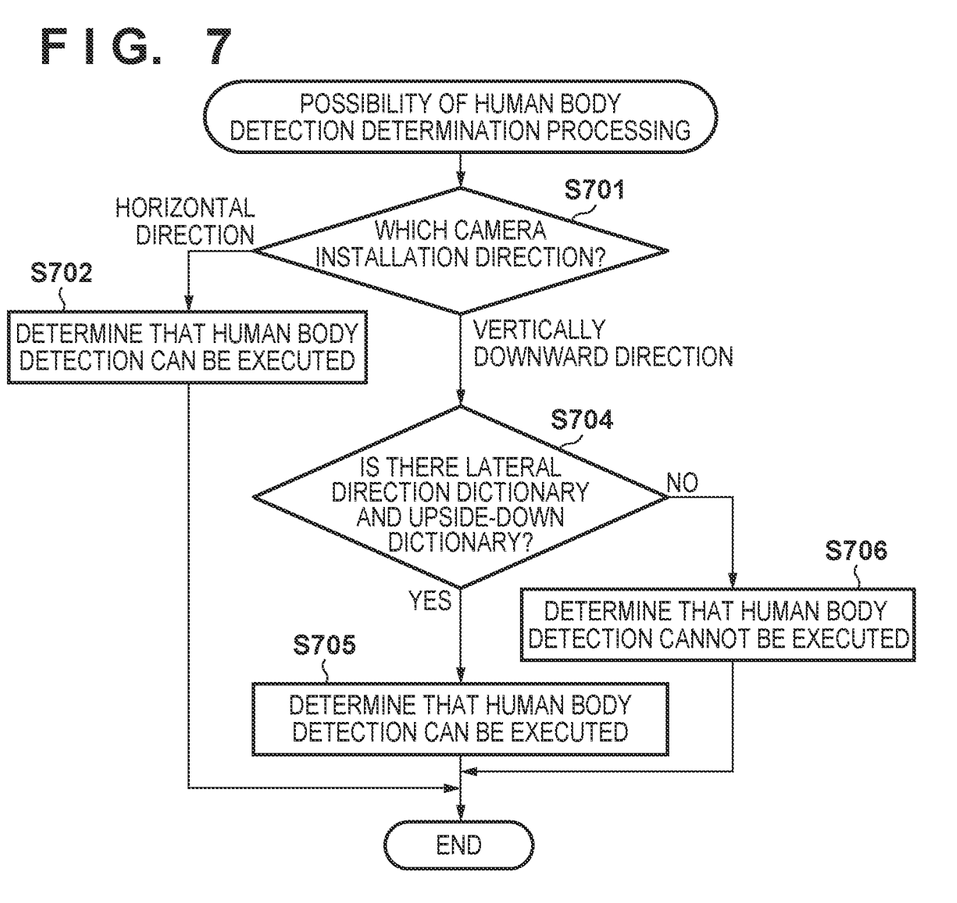
FIG. 7 is a flowchart illustrating processing according to the second embodiment.

In this embodiment, processing according to the flowchart of FIG. 7 is executed before the start of the processing in accordance with the flowchart of FIG. 2. In step S701, a determination unit 102 determines the installation direction of the camera device 1000 by the same process as that in the above-described step S201. As a result of this determination, if the installation direction of the camera device 1000 is set to the horizontal direction, the process advances to step S702. If the installation direction of the camera device 1000 is set to the vertically downward direction, the process advances to step S704.

In step S702, the determination unit 115 determines that human body discrimination processing can be performed on the processing target image. On the other hand, in step S704, the determination unit 115 determines whether the lateral direction dictionary and the upside-down direction dictionary have been additionally registered to the camera device 1000 by the adding unit 114. As a result of this determination, if it is determined that the lateral direction dictionary and the upside-down direction dictionary have been additionally registered by the adding unit 114, the process advances to step S705. If it is determined that the lateral direction dictionary and the upside-down direction dictionary have not been additionally registered by the adding unit 114, the process advances to step S706.

In step S705, the determination unit 115 determines that the human body discrimination processing can be performed on the processing target image. On the other hand, in step S706, determination unit 115 determines that human body discrimination processing cannot be performed on the processing target image.

As described above, since the determination unit 115 will determine that "the human body discrimination processing can be performed on the processing target image" if the installation direction of the camera device 1000 is the horizontal direction, processing according to the flowchart of FIG. 3 will be performed in the same manner as the first embodiment in step S212 of FIG. 2. Note that the frontal direction dictionary is the dictionary which will be used by the human body detection unit 109 at this time.

On the other hand, even if the installation direction of the camera device 1000 is vertically downward direction, in a case in which the lateral direction dictionary and the upside-down direction dictionary have been registered as described above, the determination unit 115 will determine that "the human body discrimination processing can be performed on the processing target image". Hence, in this case, in step S210, the human body detection unit 109 will perform processing in accordance with the flowchart of FIG. 3. During the processing, in step S301, the lateral direction dictionary and the upside-down direction dictionary will be used in addition to the frontal direction dictionary to execute processing to determine whether each moving object is a human body. Also, in this case, the process of step S211 can be omitted.

In a case in which the installation direction of the camera device 1000 is vertically downward direction, but the lateral direction dictionary and the upside-down direction dictionary have not been registered, the determination unit 115 will determine that "the human body discrimination processing cannot be performed on the processing target image". Hence, in this case, in step S210, the human body detection unit 109 will perform the same processing as that in the first embodiment.

In this manner, according to the second embodiment, since the possibility of executing human body detection is determined based on the presence/absence of additional human body dictionaries, it becomes possible to determine the passage of a moving object which has been associated with a human body attribute when human body dictionaries have been added even in a case in which the installation direction of the camera device 1000 is horizontal or vertically downward.

Third Embodiment

Functional units of a camera device 1000 shown in each of FIGS. 1 and 5 may be implemented by hardware or some of the functional units may be implemented by software. For example, a computer program to cause a control unit 105 to execute the functions of one or more functional units other than an image capturing unit 101, the control unit 105, an I/F unit 106, and a holding unit 111 may be stored in a memory included in the control unit 105. In this case, this computer program is executed by a processor included in the control unit 105, thereby allowing the control unit 105 to implement the functions of the corresponding functional units.

The camera device 1000 shown in each of the FIGS. 1 and 5 may be formed by two or more devices. For example, the camera device 1000 shown in each of the FIGS. 1 and 5 may be formed by an image capturing device that functions as the image capturing unit 101 and a computer device that includes a group of functional units other than the image capturing unit 101. In this case, the image capturing device and a terminal device 2000 which has been described above are connected to the computer device. The image capturing device and the computer device can operate cooperatively to function as the above-described camera device 1000.

The arrangement of the camera device 1000 shown in each of the FIGS. 1 and 5 may be changed appropriately. For example, in the arrangements of FIGS. 1 and 5, although an image output from an image conversion unit 103 was compression-coded by an image encoding unit 104, the image encoding unit 104 may be omitted and the image output from the image conversion unit 103 may be transmitted to the terminal device 2000 without undergoing the compression-coding process. It may also be set so that the execution of compression coding by the image encoding unit 104 can be switched in accordance with an instruction from the user or the like. In addition, even in a case in which compression coding is to be executed, the compression-coding method is not particularly limited to a specific compression-coding method.

Although each of the numbers of camera devices 1000 and terminal devices 2000 is one in each of the FIGS. 1 and 5, each of the numbers camera devices 1000 and terminal devices 2000 is not limited to one and may be two or more. A device other than the terminal device 2000 may also be connected to the camera device 1000.

In addition, other types of object regions such as an "animal", a "vehicle", a "building", and the like may be set as a target instead of a "human body region" in the first and second embodiments. Also, in the first and second embodiments, a video may be a moving image or a set of still images captured regularly or irregularly.

In addition, since the processing according to FIG. 3 can acquire the passage detection result of a moving object region that has been associated with a non-human body attribute, this may be notified to the operator. That is, the usage method of the human body region detection result of the passage detection processing is not particularly limited to a particular usage method.

In addition, the first and second embodiments assumed that processing to discriminate whether a moving object is a human body will not be performed in a case in which the installation direction of the camera device 1000 was the vertically downward direction and a case in which human body discrimination dictionaries were absent. Such a state may also be caused in a case in which a moving object in the image is difficult to discriminate or cannot be discriminated as a human body. Hence, whether to perform human body discrimination may be switched in accordance with whether the image capturing condition of the camera device 1000 is in a state that is difficult to discriminate a human body, other than in accordance with the installation direction of the camera device 1000 and the presence/absence of the human body discrimination dictionaries. A situation in which "the image capturing condition of the camera device 1000 is in a state that is difficult to discriminate a human body" includes, for example, situations in which the brightness of the image capturing environment of the image capturing unit 101 is too dark or too bright, a thick fog is present, and the like. For example, in step S208, if the image capturing condition is in a state that is difficult to discriminate a human body, it may be set so that the process advances to step S210. If the image capturing condition is in a state that is not difficult to discriminate a human body, it may be set so that the process advances to step S212.

Note that in the determination as to whether the image capturing condition is in a "state that is not difficult to discriminate a human body", for example, it may be set so that a "state that is not difficult to discriminate a human body" will be determined when a sensor included in the camera device 1000 detects a brightness of a predetermined level or less or a brightness of a predetermined level or more. In addition, it may be set so that a "state that is not difficult to discriminate a human body" will be determined when there is a large amount of blur in the captured image. Note that some or all of the above-described embodiments may be appropriately combined. Note also that some or all of the above-described embodiments may be selectively used.

In addition, other than the passage detection processing, the present invention is applicable to count processing in which the number of objects included in a captured image is counted. That is, it may be set so that one of first count processing in which the number of objects included in the captured image is counted without using the discrimination result that indicates whether each object is a specific object (for example, a human body) or second count processing in which the number of objects included in the captured image is counted by using the discrimination result that indicates whether each object is a specific object (for example, a human body) will be executed in correspondence with the image capturing condition of the image capturing device. That is, in a case in which the installation direction of the image capturing device is the vertically downward direction, the first count processing will be executed, and in a case in which the installation direction of the image capturing device is the horizontal direction, the second count processing will be executed.

Assume that a moving object (or a foreground object) will be counted regardless of whether it is a human body in the first count processing, and only a moving object that has been determined to be a human body will be counted in the second count processing. For example, the first count processing will be executed in step S210, and the second count processing will be executed in step S212. Each of the above-described count processing operations will be executed by the control unit 105 based on the outputs from a moving object detection unit 107, a moving object tracking unit 108, a human body detection unit 109, and an association unit 110.

Furthermore, the terminal device 2000 as an image processing apparatus may execute some or all of the processing operations (for example, processing operations in accordance with the flowcharts of FIGS. 2, 3, and 7, respectively) described as processing to be performed by the camera device 1000 as an image processing apparatus in the above description.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-230869, filed Nov. 30, 2017, which is hereby incorporated by reference herein in its entirety.

What is claimed is:

1. An image processing apparatus comprising:
one or more hardware processors; and
one or more memories which stores instructions executable by the one or more hardware processors to cause the image processing apparatus to function as:
an acquiring unit configured to acquire information on an installation setting of an image capturing unit which captures an image using a fish-eye lens; and
an execution unit configured to execute passage detection processing to detect whether an object in a captured image by the image capturing unit has passed a predetermined position using at least one of a result of first detection and a result of second detection, the first detection detecting a human in the captured image, the second detection detecting a moving object in the captured image,
wherein the execution unit is configured:
to execute, in a case where the installation setting of the image capturing unit corresponds to a ceiling, the passage detection processing by using the result of the second detection without using the result of the first detection; and
to execute, in a case where the installation setting of the image capturing unit corresponds to a wall, the passage detection processing by using both of the result of the first detection and the result of the second detection.

2. The image processing apparatus according to claim 1, wherein, in a case where the installation setting of the image capturing unit corresponds to the wall, the execution unit generates a single panorama image from the captured image captured by the image capturing unit to execute the passage detection processing in the generated single panorama image by using both the result of the first detection and the result of the second detection.

3. The image processing apparatus according to claim 1, wherein even in a case where the installation setting of the image capturing unit corresponds to the ceiling, the execution unit executes the passage detection processing by using the result of the first detection if a-plurality of dictionaries for detecting a human are registered in the image processing apparatus, and wherein the plurality of dictionaries corresponds to a plurality of directions of the human.

4. The image processing apparatus according to claim 3, wherein the instructions are executable by the one or more hardware processors to further cause the image processing apparatus to register the plurality of dictionaries to the image processing apparatus.

5. The image processing apparatus according to claim 1, wherein the execution unit executes, in a case where the installation setting of the image capturing unit corresponds to the wall, the passage detection processing to detect that an object which has been detected as a human among objects in the captured image has passed the predetermined position in the captured image.

6. A method of controlling an image processing apparatus, the method comprising:
acquiring information on an installation setting of an image capturing unit which captures an image using a fish-eye lens; and
executing passage detection processing to detect whether an object in a captured image by the image capturing unit has passed a predetermined position using at least one of a result of first detection and a result of second detection, the first detection detecting a human in the captured image, the second detection detecting a moving object in the captured image,
wherein executing the passage detection processing includes:
executing, in a case where the installation setting of the image capturing unit corresponds to a ceiling, the passage detection processing by using the result of the second detection without using the result of the first detection; and executing, in a case where the installation setting of the image capturing unit corresponds to a wall, the passage detection processing by using both of the result of the first detection and the result of the second detection.

7. A non-transitory computer-readable storage medium storing a computer program for causing a computer to execute a method of controlling an image processing apparatus, the method comprising:

acquiring information on an installation setting of an image capturing unit which captures an image using a fish-eye lens; and executing passage detection processing to detect whether an object in a captured image by the image capturing unit has passed a predetermined position using at least one of a result of first detection and a result of second detection, the first detection detecting a human in the captured image, the second detection detecting a moving object in the captured image, wherein executing the passage detection processing includes:

executing, in a case where the installation setting of the image capturing unit corresponds to a ceiling, the passage detection processing by using the result of the second detection without using the result of the first detection; and executing, in a case where the installation setting of the image capturing unit corresponds to a wall, the passage detection processing by using both of the result of the first detection and the result of the second detection.

* * * * *